United States Patent
Kwack et al.

(10) Patent No.: US 12,526,883 B2
(45) Date of Patent: Jan. 13, 2026

(54) INDUCTION HEATING COOKTOP

(71) Applicants: LG Electronics Inc., Seoul (KR); Korea Advanced Institute of Science and Technology, Daejeon (KR)

(72) Inventors: Younghwan Kwack, Seoul (KR); Seongho Son, Seoul (KR); Seonho Jeon, Seoul (KR); Chuhyoung Cho, Seoul (KR); Jongseong Ji, Seoul (KR); Keeyoung Son, Daegu (KR); Boogyo Sim, Daejeon (KR)

(73) Assignees: LG Electronics Inc., Seoul (KR); Korea Advanced Institute of Science and Technology, Daejeon (KR)

( * ) Notice: Subject to any disclaimer, the term of this patent is extended or adjusted under 35 U.S.C. 154(b) by 389 days.

(21) Appl. No.: 17/914,912

(22) PCT Filed: Mar. 19, 2021

(86) PCT No.: PCT/KR2021/003439
§ 371 (c)(1),
(2) Date: Sep. 27, 2022

(87) PCT Pub. No.: WO2021/194173
PCT Pub. Date: Sep. 30, 2021

(65) Prior Publication Data
US 2023/0134447 A1    May 4, 2023

(30) Foreign Application Priority Data

Mar. 27, 2020  (KR) .................. 10-2020-0037624

(51) Int. Cl.
*H05B 6/12*   (2006.01)
*H05B 3/00*   (2006.01)
(Continued)

(52) U.S. Cl.
CPC ......... *H05B 6/1209* (2013.01); *H05B 3/0014* (2013.01); *H05B 3/68* (2013.01); *H05B 11/00* (2013.01)

(58) Field of Classification Search
CPC ...... H05B 3/68; H05B 3/0014; H05B 6/1209; H05B 11/00; Y02B 40/00
See application file for complete search history.

(56) References Cited

U.S. PATENT DOCUMENTS 3,786,222 A * 1/1974 Harnden, Jr. ............ H05B 6/06
                                                    219/622
2001/0019052 A1 * 9/2001 Sadahira .................. H05B 6/36
                                                    219/629
(Continued)

FOREIGN PATENT DOCUMENTS

CN    103370983 A    10/2013
CN    104054392 A     9/2014
(Continued)

OTHER PUBLICATIONS

Extended European Search Report in European Appln. No. 21776779.7, mailed on Feb. 22, 2024, 10 pages.
(Continued)

*Primary Examiner* — Thien S Tran
(74) *Attorney, Agent, or Firm* — Fish & Richardson P.C.

(57) ABSTRACT

The present disclosure relates to an induction heating type cooktop and includes a case; a cover plate configured to be coupled to the upper end of the case and provided with an upper plate portion on which an object to be heated is disposed; a working coil provided inside the case; a thin film configured to be coated on the upper plate portion and to be inductively heated by the working coil; and an adiabatic material provided between the upper plate portion and the working coil, in which the thin film may be formed to have (Continued)

at least one closed loop that does not include a central region of the working coil.

18 Claims, 15 Drawing Sheets

(51) Int. Cl.
*H05B 3/68* (2006.01)
*H05B 11/00* (2006.01)

(56) References Cited

U.S. PATENT DOCUMENTS

| | | |
|---|---|---|
| 2005/0115957 A1 | 6/2005 | Kataoka et al. |
| 2005/0205561 A1* | 9/2005 | Keishima ............. H05B 6/1209 219/621 |
| 2012/0080423 A1* | 4/2012 | Takeda ..................... C25D 1/04 219/600 |
| 2019/0131824 A1 | 5/2019 | Suga et al. |
| 2020/0072472 A1 | 3/2020 | Kim et al. |

FOREIGN PATENT DOCUMENTS

| | | | |
|---|---|---|---|
| DE | 10127051 A1 * | 12/2002 | ........... H05B 6/1209 |
| EP | 3618569 | 3/2020 | |
| JP | 2008027638 A | 2/2008 | |
| JP | 2008293888 | 12/2008 | |
| JP | 2008293888 A * | 12/2008 | ........... H05B 6/1245 |
| JP | 2009123603 A | 6/2009 | |
| KR | 20050033551 | 4/2005 | |
| KR | 100915416 | 9/2009 | |
| KR | 20100010392 | 2/2010 | |
| KR | 20170070310 | 6/2017 | |
| KR | 20200025929 | 3/2020 | |
| WO | WO2018003092 | 1/2018 | |

OTHER PUBLICATIONS

International Search Report in International Appln. No. PCT/KR2021/003439, dated Jun. 28, 2021, 4 pages.
Office Action in Chinese Appln. No. 202180025027.4, mailed on May 13, 2025, 13 pages (with English translation).
Notice of Allowance in in Chinese Appln. No. 202180025027.4, mailed on Nov. 4, 2025, 7 pages (with English translation).

* cited by examiner

INDUCTION HEATING COOKTOP

CROSS-REFERENCE TO RELATED APPLICATIONS

This application is a National Stage application under 35 U.S.C. § 371 of International Application No. PCT/KR2021/003439, filed on Mar. 19, 2021, which claims the benefit of Korean Patent Application No. 10-2020-0037624, filed on Mar. 27, 2020. The disclosures of the prior applications are incorporated by reference in their entirety.

TECHNICAL FIELD

The present disclosure relates to an induction heating type cooktop. More particularly, the present disclosure relates to an induction heating type cooktop coated with a thin film.

BACKGROUND ART

Various types of cooking equipments are used to heat food at home or in a restaurant. Conventionally, gas stoves using gas as fuel have been widely used, but recently devices for heating an object to be heated, for example, cooking vessels such as pots, have been spread using electricity instead of gas.

A method of heating an object to be heated using electricity is largely divided into a resistance heating method and an induction heating method. The electric resistance method is a method of heating an object to be heated by transferring heat generated when an electric current flows through a metal resistance wire or a non-metallic heating element such as silicon carbide to the object to be heated (for example, a cooking vessel) through radiation or conduction. In addition, when high-frequency power of a predetermined size is applied to the coil, the induction heating method generates an eddy current in the object to be heated consisting of a metal component using a magnetic field generated around the coil to heat the object to be heated itself.

Recently, most of the induction heating methods are applied to cooktops.

However, in a case of a cooktop to which an induction heating method is applied, there is a limitation in that only a magnetic material can be heated. In other words, when a nonmagnetic material (for example, heat-resistant glass, pottery, or the like) is disposed on the cooktop, there is a problem that the cooktop to which the induction heating method is applied cannot heat the object to be heated.

In order to improve the problem of such an induction heating type cooktop, the present disclosure intends to use a thin film. Specifically, the cooktop according to the present disclosure may include a thin film to which an eddy current is applied so that the nonmagnetic material is heated. In addition, the thin film may be formed to have a skin depth thicker than the thickness, and accordingly, the magnetic field generated by the working coil may pass through the thin film and heat the magnetic material by applying an eddy current to the magnetic material.

Meanwhile, Korean Patent Laid-Open No. 10-2005-0033551 discloses an electric conductor disposed between a heating coil and an object to be heated, but the electrical conductor differs from the thin film according to the present disclosure in that it is inserted for the purpose of reducing magnetic buoyancy. Moreover, the electrical conductor is clearly different from the thin film described in the present disclosure in that the thickness is designed to be thicker than the skin depth.

Meanwhile, since the closed loop formed as eddy current is applied to the thin film according to the present disclosure combines with the magnetic field generated in the working coil, it may prevent the magnetic field generated in the working coil from reaching the object to be heated. Accordingly, when the magnetic material is disposed on the cooktop, there is a problem in that heating efficiency is lowered.

DISCLOSURE

Technical Problem

An object of the present disclosure is to minimize the problem of a decrease in heating efficiency for a magnetic material in an induction heating type cooktop capable of heating both a magnetic material and a nonmagnetic material.

Technical Solution

The cooktop according to an embodiment of the present disclosure may include a thin film forming a closed loop that does not include a coil center, thereby increasing a magnetic field applied to the magnetic material through the thin film.

The cooktop according to an embodiment of the present disclosure may heat both the magnetic material and the nonmagnetic material by including a thin film having a skin depth thicker than a thickness.

Advantageous Effect

According to the present disclosure, it is possible to heat both the magnetic material and the nonmagnetic material through the same heating source, and there is an advantage in that the heating performance can increase by minimizing a decrease in the heating efficiency of the magnetic material due to the thin film.

BEST MODE

Figure 1:
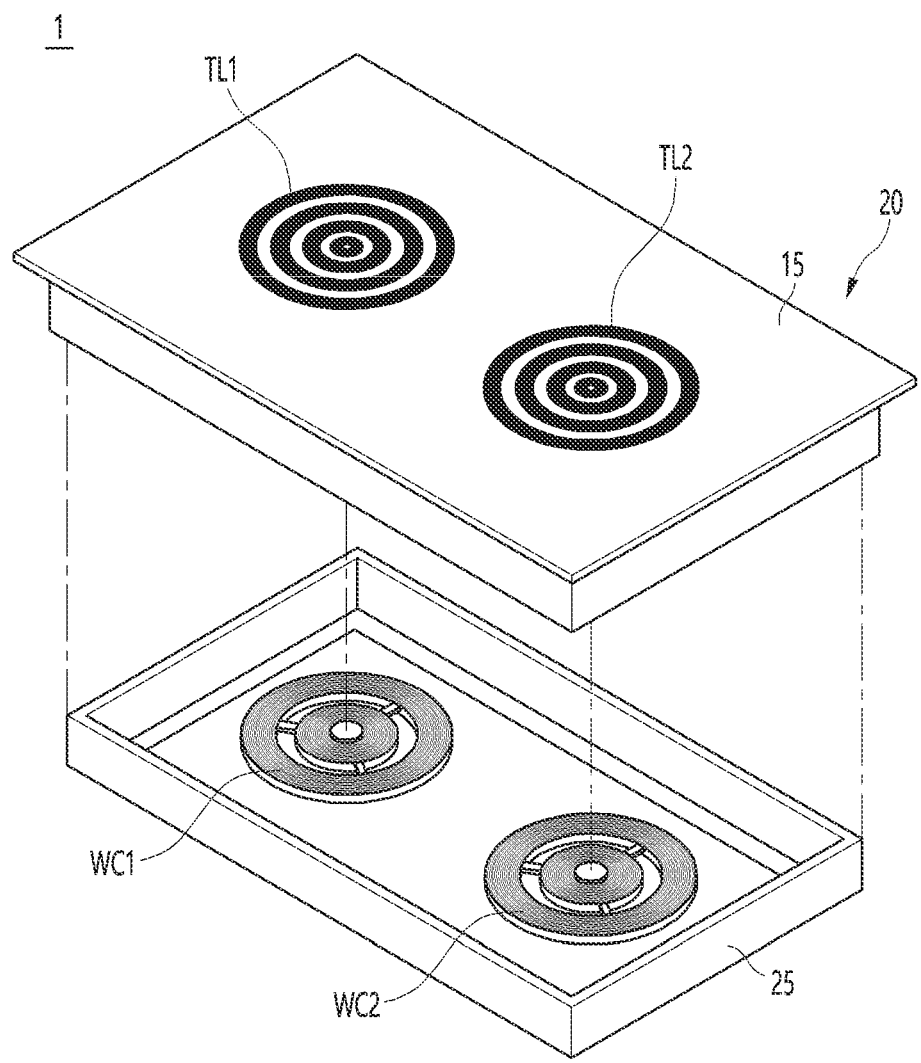
FIG. 1 is a view for explaining an induction heating type cooktop according to an embodiment of the present disclosure.

Hereinafter, preferred embodiments according to the present disclosure will be described in detail with reference to the accompanying drawings. In the drawings, the same reference numerals are used to refer to the same or similar components.

Hereinafter, an induction heating type cooktop according to an embodiment of the present disclosure will be described.

Figure 2:
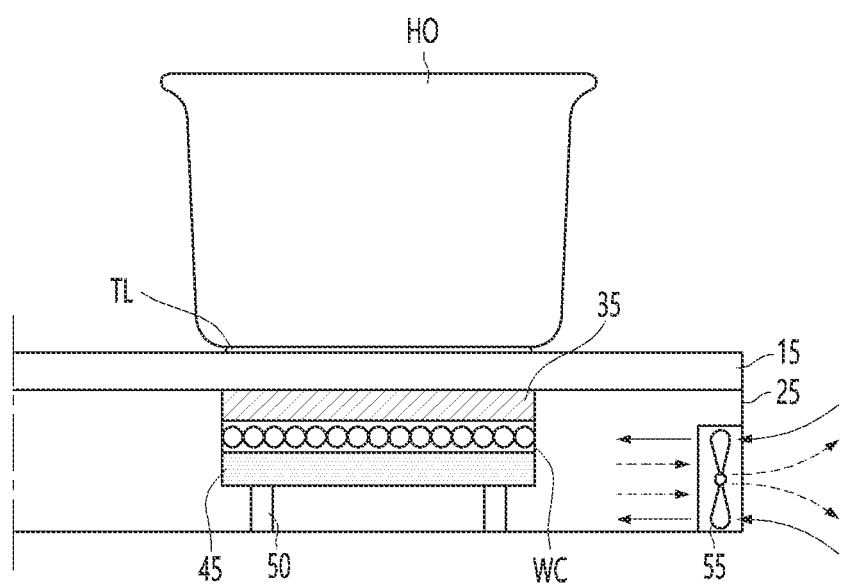
FIG. 2 is a cross-sectional view illustrating an induction heating type cooktop and an object to be heated according to an embodiment of the present disclosure.
Figure 3:
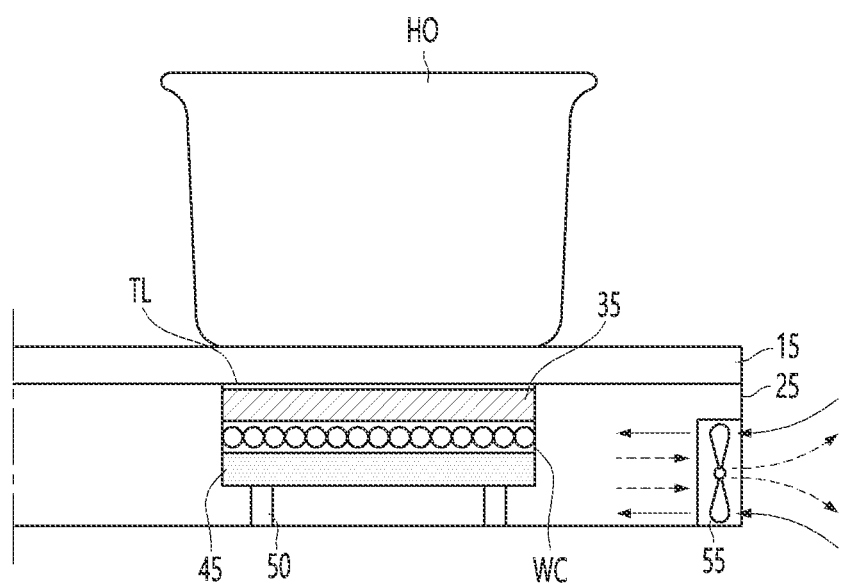
FIG. 3 is a cross-sectional view illustrating an induction heating type cooktop and an object to be heated according to another embodiment of the present disclosure.

FIG. 1 is a view for explaining an induction heating type cooktop according to an embodiment of the present disclosure, FIG. 2 is a cross-sectional view illustrating an induction heating type cooktop and an object to be heated according to an embodiment of the present disclosure, and FIG. 3 is a cross-sectional view illustrating an induction heating type cooktop and an object to be heated according to another embodiment of the present disclosure.

First, referring to FIG. 1, an induction heating type cooktop 1 according to an embodiment of the present disclosure may include a case 25, a cover plate 20, and working coils WC1 and WC2 (that is, the first and second working coils) and thin films TL1 and TL2 (that is, first and second thin films).

Working coils WC1 and WC2 may be installed in the case 25.

For reference, in the case 25, in addition to the working coils WC1 and WC2, various devices related to the driving of the working coil (for example, a power supply providing AC power, a rectifying portion for rectifying the AC power of the power supply into DC power, an inverter portion that converts DC power rectified by the rectifying portion into a resonance current through a switching operation to provide the resonance current to the working con, a control module that controls the operation of various devices in the induction heating type cooktop 1, and a relay or semiconductor switch that turns the working coil on or off, and the like) may be installed, but a detailed description thereof will be omitted.

The cover plate 20 is coupled to the upper end of the case 25, and an upper plate portion 15 on which an object to be heated (not illustrated) is disposed may be provided on the upper surface.

Specifically, the cover plate 20 may include an upper plate portion 15 for placing an object to be heated, such as a cooking vessel.

Here, the upper plate portion 15 may be made of, for example, a glass material (for example, ceramics glass).

In addition, the upper plate portion 15 may be provided with an input interface (not illustrated) that receives an input from a user and transmits the input to a control module (not illustrated) for an input interface. Of course, the input interface may be provided at a location other than the upper plate portion 15.

For reference, the input interface is a module for inputting a desired heating intensity or operating time of the induction heating type cooktop 1 and may be variously implemented as a physical button or a touch panel. In addition, the input interface may include, for example, a power button, a lock button, a power level adjustment button (+, −), a timer adjustment button (+, −), a charging mode button, and the like. In addition, the input interface may transmit the input received from the user to the control module for the input interface (not illustrated), and the control module for the input interface may transmit the input to the aforementioned control module (that is, the control module for the inverter).

In addition, the above-described control module can control the operation of various devices (for example, a working coil) based on an input (that is, a user input) received from the control module for the input interface, and specific details thereof will be omitted.

Meanwhile, on the upper plate portion 15, whether the working coils WC1 and WC2 are driven and the heating intensity (that is, thermal power) may be visually displayed in the shape of a crater. The shape of the crater may be indicated by an indicator (not illustrated) composed of a plurality of light emitting devices (for example, LEDs) provided in the case 25.

The working coils WC1 and WC2 may be installed inside the case 25 to heat the object to be heated.

Specifically, the working coil WC may be controlled to be driven by the aforementioned control module (not illustrated), and when the object to be heated is disposed on the upper plate portion 15, the working coil WC may be driven by the control module.

In addition, the working coil WC can directly heat a magnetic object to be heated (that is, a magnetic material), and can indirectly heat a nonmagnetic object to be heated through a thin film TL, which will be described later.

In addition, the working coil WC may heat an object to be heated by an induction heating method and may be provided to overlap the thin film TL in a longitudinal direction (that is, a vertical direction or an up and down direction).

For reference, although it is illustrated in FIG. 1 that two working coils WC1 and WC2 are installed in the case 25, the present disclosure is not limited thereto. In other words, one or three or more working coils may be installed in the case 25, but for convenience of explanation, the embodiment of the present disclosure will describe with an example in which two working coils WC1 and WC2 are installed in the case 25.

The thin film TL may be coated on the upper plate portion 15 to heat a nonmagnetic material among the objects to be heated. The thin film TL may be inductively heated by the working coil WC.

The thin film TL may be coated on the upper surface or the lower surface of the upper plate portion 15. For example, as illustrated in FIG. 2, the thin film TL may be coated on the upper surface of the upper plate portion 15, or as illustrated in FIG. 3, the thin film TL may be coated on the lower surface of the upper plate portion 15.

The thin film TL may be provided to overlap the working coil WC in a longitudinal direction (that is, a vertical direction or an up and down direction). Accordingly, it is possible to heat the object to be heated regardless of the disposition position and type of the object to be heated.

In addition, the thin film TL may have at least one of magnetic and nonmagnetic properties (that is, magnetic, nonmagnetic, or both magnetic and nonmagnetic).

In addition, the thin film TL may be made of, for example, a conductive material (for example, aluminum), and as illustrated in the drawing, a plurality of rings of different diameters may be coated on the upper plate portion 15 in a repeating shape, but is not limited thereto. In other words, the thin film TL may be made of a material other than the conductive material. In addition, the thin film TL may be formed in a shape other than a shape in which a plurality of rings having different diameters are repeated. Various shapes of the thin film TL will be described in more detail with reference to FIGS. 10 to 15.

For reference, although one thin film TL is illustrated in FIGS. 2 and 3, the present disclosure is not limited thereto. In other words, a plurality of thin films may be coated, but for convenience of description, a case where one thin film TL is coated will be described as an example.

A more detailed description of the thin film TL will be described later.

Next, referring to FIGS. 2 and 3, the induction heating type cooktop 1 according to an embodiment of the present disclosure may further include at least some or all of an adiabatic material 35, a shielding plate 45, a support member 50, and a cooling fan 55.

The adiabatic material 35 may be provided between the upper plate portion 15 and the working coil WC.

Specifically, the adiabatic material 35 may be mounted under the upper plate portion 15, and a working coil WC may be disposed under the adiabatic material.

The adiabatic material 35 may block the transfer of heat generated to the working coil WC while the thin film TL or the object to be heated HO is heated by the driving of the working coil WC.

In other words, when the thin film TL or the object to be heated HO is heated by electromagnetic induction of the working coil WC, the heat of the thin film TL or the object to be heated HO is transferred to the upper plate portion 15, and the heat of the upper plate portion 15 is transferred back to the working coil WC, and thus the working coil WC may be damaged.

The adiabatic material 35 blocks the heat transferred to the working coil WC in this way, thereby preventing the working coil WC from being damaged by heat, and furthermore, preventing the decrease in the heating performance of the working coil WC.

For reference, although it is not an essential component, a spacer (not illustrated) may be installed between the working coil WC and the adiabatic material 35.

Specifically, a spacer (not illustrated) may be inserted between the working coil WC and the adiabatic material 35 so that the working coil WC and the adiabatic material 35 do not directly contact each other. Accordingly, the spacer (not illustrated) may block the transfer of heat generated while the thin film TL or the object to be heated HO is heated by the driving of the working coil WC to the working coil WC through the adiabatic material 35.

In other words, the spacer (not illustrated) can share a part of the role of the adiabatic material 35, and thus the thickness of the adiabatic material 35 can be minimized, and through this, the spacing between the object to be heated HO and the working coil WC can be minimized.

In addition, a plurality of spacers (not illustrated) may be provided, and the plurality of spacers may be disposed to be spaced apart from each other between the working coil WC and the adiabatic material 35. Accordingly, the air suctioned into the case 25 by the cooling fan 55 to be described later may be guided to the working coil WC by the spacer.

In other words, the spacer may improve the cooling efficiency of the working coil WC by guiding the air flowing into the case 25 by the cooling fan 55 to be properly transmitted to the working coil WC.

The shielding plate 45 may be mounted on the lower surface of the working coil WC to block a magnetic field generated downward when the working coil WC is driven.

Specifically, the shielding plate 45 may block a magnetic field generated downward when the working coil WC is driven and may be supported upward by the support member 50.

The support member 50 may be installed between the lower surface of the shielding plate 45 and the lower plate of the case 25 to support the shielding plate 45 upward.

Specifically, the support member 50 may support the shielding plate 45 upwardly, thereby indirectly supporting the adiabatic material 35 and the working coil WC upwardly, and through this, the adiabatic material 35 can be in close contact with the upper plate portion 15.

As a result, the distance between the working coil WC and the object to be heated HO can be kept constant.

For reference, the support member 50 may include, for example, an elastic body (for example, a spring) for supporting the shielding plate 45 upward, but is not limited thereto. In addition, since the support member 50 is not an essential component, the induction heating type cooktop 1 may be omitted.

The cooling fan 55 may be installed inside the case 25 to cool the working coil WC.

Specifically, the cooling fan 55 may be controlled to be driven by the aforementioned control module and may be installed on the sidewall of the case 25. Of course, the cooling fan 55 may be installed at a location other than the sidewall of the case 25, but in an embodiment of the present disclosure, for convenience of explanation, a case where the cooling fan 55 is installed on the side wall of the case 25 will be described as an example.

In addition, as illustrated in FIGS. 2 and 3, the cooling fan 55 suctions air from the outside of the case 25 and delivers the air to the working coil WC or suctions air (particularly, heat) inside the case 25 to be capable of discharging the air to the outside of the case 25.

Through this, efficient cooling of the components (particularly, the working coil WC) inside the case 25 is possible.

In addition, as described above, the air outside the case 25 delivered to the working coil WC by the cooling fan 55 may be guided to the working coil WC by the spacer. Accordingly, direct and efficient cooling of the working coil WC is possible, thereby being capable of improving the durability of the working coil WC (that is, improving the durability by preventing thermal damage).

As such, the induction heating type cooktop 1 according to an embodiment of the present disclosure may have the above-described characteristics and configuration, and hereinafter, with reference to FIGS. 4 to 7, the characteristics and configuration of the above-described thin film is described in more detail.

Figure 4:
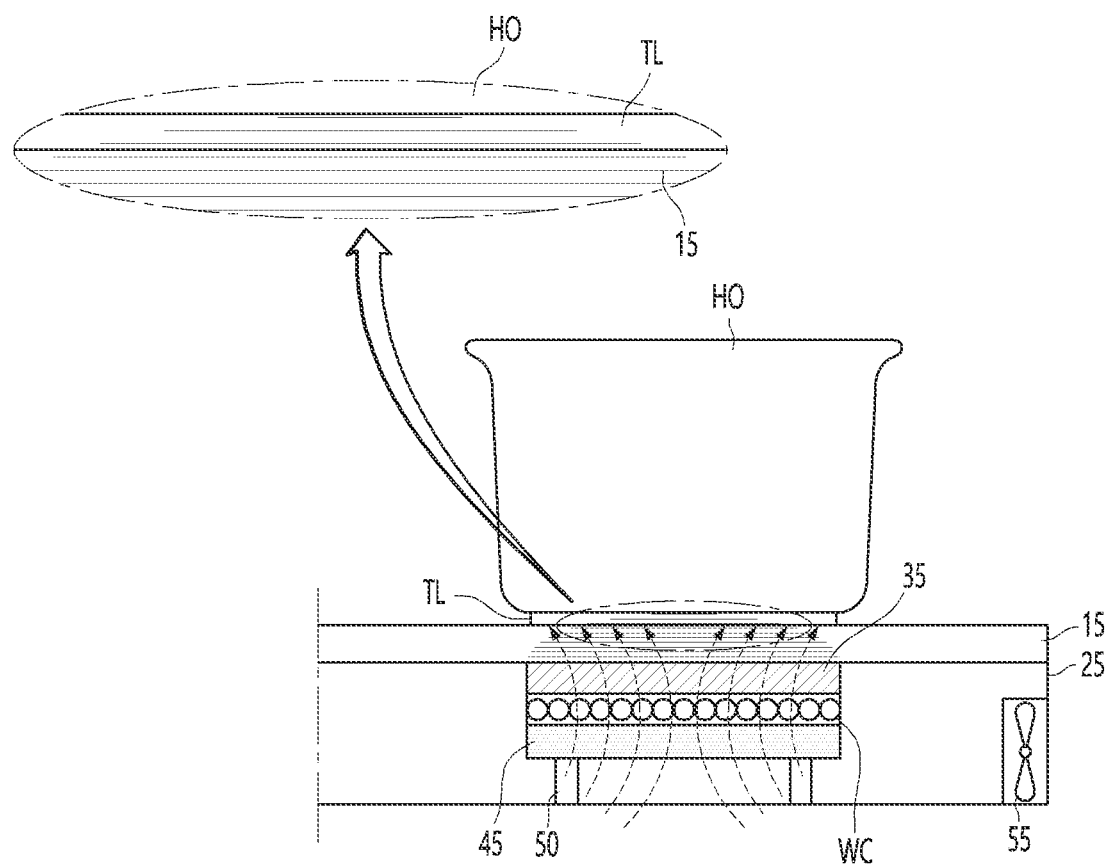
FIGS. 4 and 5 are diagrams for explaining a relationship between a thickness of a thin film and a skin depth.
Figure 5:
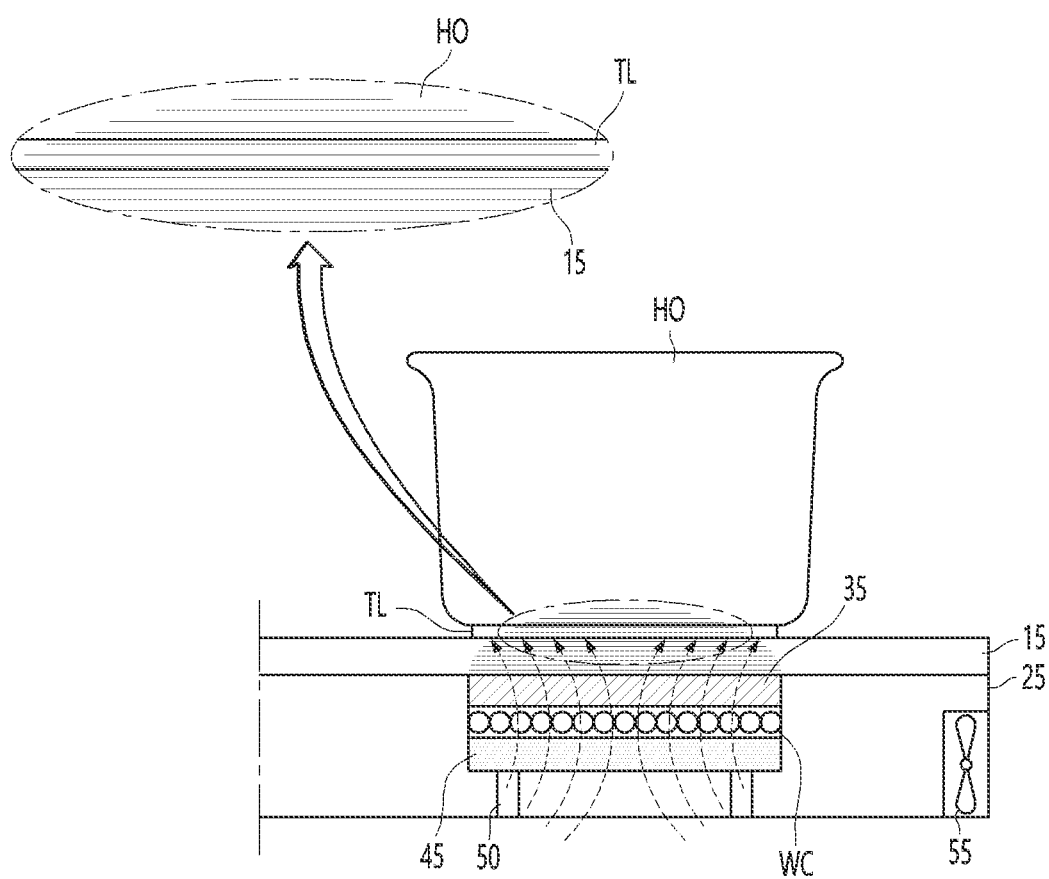
Figure 6:
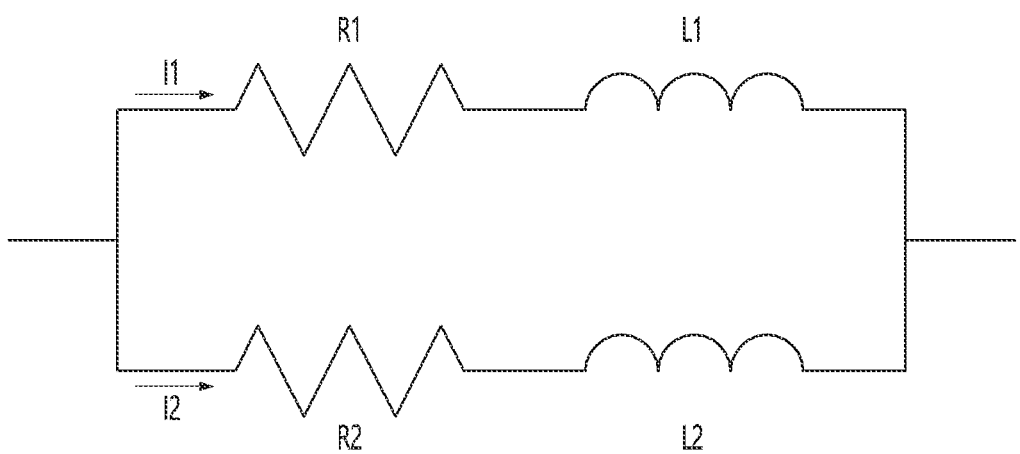
FIGS. 6 and 7 are diagrams for explaining a change in impedance between a thin film and an object to be heated according to the type of object to be heated.
Figure 7:
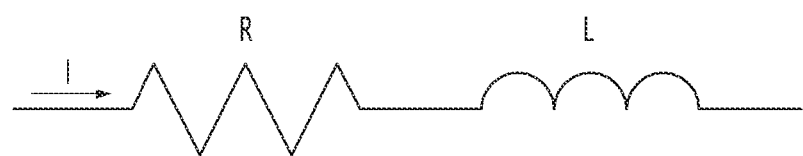

FIGS. 4 and 5 are diagrams for explaining a relationship between a thickness of a thin film and a skin depth, and FIGS. 6 and 7 are diagrams for explaining a change in impedance between a thin film and an object to be heated according to the type of object to be heated.

The thin film TL may be made of a material having low relative permeability.

Specifically, since the relative permeability of the thin film TL is low, the skin depth of the thin film TL may be deep. Here, the skin depth means an electric current penetration depth from the surface of the material, and the relative permeability may be inversely proportional to the skin depth. Accordingly, as the relative permeability of the thin film TL decreases, the skin depth of the thin film TL deeps.

In addition, the skin depth of the thin film TL may be thicker than the thickness of the thin film TL. In other words, the thin film TL has a thin thickness (for example, 0.1 um to 1,000 um thickness), and since the skin depth of the thin film TL is deeper than the thickness of the thin film TL, the magnetic field generated by the working coil WC passes through the thin film to transfer to the object to be heated HO and thus an eddy current may be induced in the object to be heated HO.

In other words, as illustrated in FIG. 4, when the skin depth of the thin film TL is shallower than the thickness of the thin film TL, it can be difficult for the magnetic field generated by the working coil WC to reach the object to be heated HO.

However, as illustrated in FIG. 5, when the skin depth of the thin film TL is deeper than the thickness of the thin film TL, the magnetic field generated by the working coil WC may reach the object to be heated HO. In other words, in the embodiment of the present disclosure, since the skin depth of the thin film TL is deeper than the thickness of the thin film TL, the magnetic field generated by the working coil WC passes through the thin film TL and most of the magnetic field is transferred to the object to be heated HO and consumed, and accordingly, the object to be heated HO can be mainly heated.

Meanwhile, since the thin film TL has a thin thickness as described above, the thin film TL may have a resistance value that can be heated by the working coil WC.

Specifically, the thickness of the thin film TL may be inversely proportional to a resistance value (that is, surface resistance value) of the thin film TL. In other words, as the thickness of the thin film TL coated on the upper plate portion 15 is thinner, since the resistance value (that is, surface resistance value) of the thin film TL increases, the thin film TL may be thinly coated on the upper plate portion 15, so that characteristics may be changed to a load that can be heated.

For reference, the thin film TL may have a thickness of, for example, 0.1 μm to 1,000 μm, but is not limited thereto.

The thin film TL having such a characteristic is present to heat the nonmagnetic material, and the impedance characteristic between the thin film TL and the object to be heated HO can be changed according to whether the object to be heated HO disposed on the upper plate portion 15 is a magnetic material or a nonmagnetic material.

First, a case whether the object to be heated HO is a magnetic material will be described as follows.

When the magnetic object to be heated HO is disposed on the upper plate portion 15, and the working coil WC is driven, as illustrated in FIG. 6, the resistance component R1 and the inductor component L1 of the object to be heated HO may form an equivalent circuit with the resistance component R2 and the inductor component L2 of the thin film TL.

In this case, the impedance of the magnetic object to be heated HO (that is, the impedance composed of R1 and L1) may be smaller than the impedance of the thin film TL (that is, the impedance composed of R2 and L2).

Accordingly, when the equivalent circuit as described above is formed, the magnitude of the eddy current I1 applied to the magnetic object to be heated HO may be greater than the magnitude of the eddy current I2 applied to the thin film TL. Accordingly, most of the eddy currents generated by the working coil WC may be applied to the object to be heated HO, so that the object to be heated HO may be heated.

In other words, when the object to be heated HO is a magnetic material, since the above-described equivalent circuit is formed and most of the eddy current is applied to the object HO, the working coil WC can directly heat the object to be heated HO.

Of course, since some eddy current is also applied to the thin film TL to slightly heat the thin film TL, the object to be heated HO may be slightly heated indirectly by the thin film TL. In this case, the working coil WC may be a main heating source, and the thin film TL may be a secondary heating source. However, compared with the degree to which the object HO is directly heated by the working coil WC, the degree to which the object to be heated HO is indirectly heated by the thin film TL may be not significant.

Next, a case where the object to be heated is a nonmagnetic material will be described as follows.

When the nonmagnetic object to be heated HO is disposed on the upper plate portion 15 and the working coil WC is driven, there may be no impedance in the nonmagnetic object to be heated HO, and there may be impedance the thin film TL. In other words, the resistance component R and the inductor component L may exist only in the thin film TL.

Accordingly, when the nonmagnetic object to be heated HO is disposed on the upper plate portion 15 and the working coil WC is driven, as illustrated in FIG. 7, the resistance component R and the inductor component L of the thin film TL may form an equivalent circuit.

Accordingly, the eddy current I may be applied only to the thin film TL, and the eddy current may not be applied to the nonmagnetic object to be heated. More specifically, the eddy current I generated by the working coil WC may be applied only to the thin film TL, so that the thin film TL may be heated.

In other words, when the object to be heated HO is a nonmagnetic material, as described above, since the eddy current I is applied to the thin film TL to heat the thin film TL, the nonmagnetic object to be heated HO may be indirectly heated by the thin film TL heated by the working coil WC. In this case, the thin film TL may be a main heating source.

In summary, the object to be heated HO may be directly or indirectly heated by a single heat source called the working coil WC regardless of whether the object to be heated HO is a magnetic material or a nonmagnetic material. In other words, when the object to be heated HO is a magnetic material, the working coil WC directly heats the object to be heated HO, and when the object to be heated HO is a nonmagnetic material, the thin film TL heated by the working coil WC can indirectly heat the object to be heated HO.

As described above, since the induction heating type cooktop 1 according to an embodiment of the present disclosure can heat both a magnetic material and a nonmagnetic material, regardless of the disposition position and type of the object to be heated HO, the object to be heated can be heated. Accordingly, since the user may place the object to be heated on any heating area on the top plate portion 15 without needing to determine whether the object to be heated HO is a magnetic material or a nonmagnetic material, ease of use may be improved.

In addition, since the induction heating type cooktop 1 of according to an embodiment of the present disclosure can directly or indirectly heat an object to be heated with the same heat source, there is no need to provide a separate heating plate or a radiant heater. Accordingly, it is possible to not only increase the heating efficiency but also reduce the material cost.

Meanwhile, the heating performance of the magnetic material and the nonmagnetic material may vary according to the shape; thickness, and the like of the thin film TL. In particular, when the object to be heated HO is a magnetic material, since the working coil WC heats both the object to be heated HO and the thin film TL, the amount of energy generated by each of the object to be heated HO and the thin films TL is changed, and accordingly, the temperature, time, and the like at which the object to be heated HO is heated is changed. For example, according to the shape, thickness, or the like of the thin film TL, the amount of energy generated by the thin film TL may be greater than the amount of energy generated by the object to be heated HO, which is the magnetic material, and in this case, a problem may arise in that the time required to heat the object to be heated HO to a certain temperature becomes too long. Accordingly, when the thin film TL is a main heating source and a sub-heating source, a design may be required to ensure heating performance, respectively.

Figure 8:
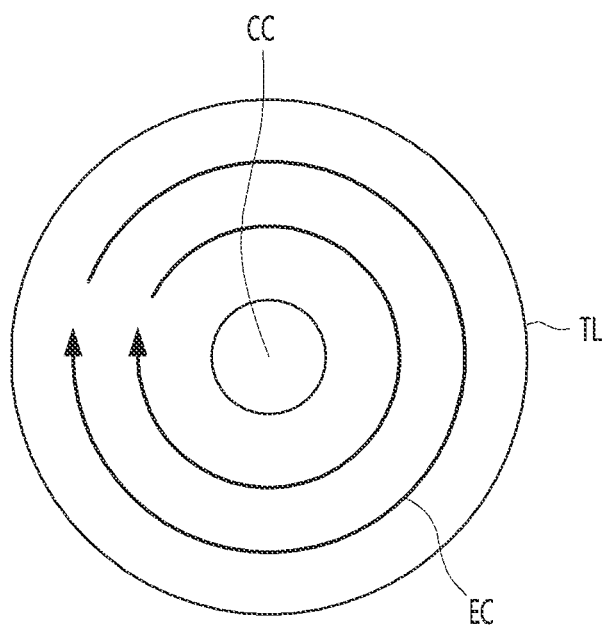
FIG. 8 is an exemplary view illustrating a shape of a thin film according to a comparative example of the present disclosure.

FIG. 8 is an exemplary view illustrating a shape of a thin film according to a comparative example of the present disclosure.

The thin film TL according to the comparative example of the present disclosure may have a ring shape. An eddy current EC applied to the ring-shaped thin film TL may form a closed loop including a center area CC of working coil.

The center region CC of the working coil may refer to a region overlapping the center of the working coil WC in a vertical direction. The center of the working coil WC may include an region up to a center of the working coil WC and a predetermined distance from the center of the working coil WC.

As such, the thin film TL formed so that the closed loop includes the working coil center region CC may have a strong coupling force with the magnetic field generated by the working coil WC.

Accordingly, when the object to be heated HO, which is a magnetic material, is placed on the upper plate portion 15, the magnetic field that reaches the object to be heated HO is reduced because there are many magnetic fields coupled to the thin film TL among the magnetic fields generated by the working coil WC and accordingly, the heating performance of the object to be heated HO somewhat decrease.

Accordingly, the cooktop 1 according to the present disclosure may include the thin film TL formed to have at least one closed loop that does not include the central region CC of the working coil so as to improve the heating performance of the object to be heated HO which is the magnetic material.

Figure 9:
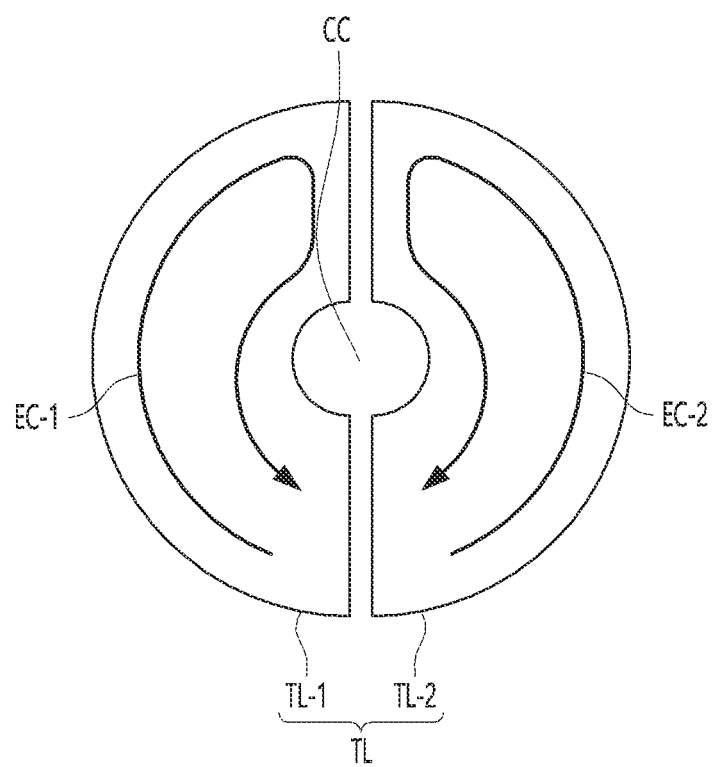
FIGS. 9 and 10 are exemplary views illustrating the shape of the thin film according to the first embodiment of the present disclosure.
Figure 10:
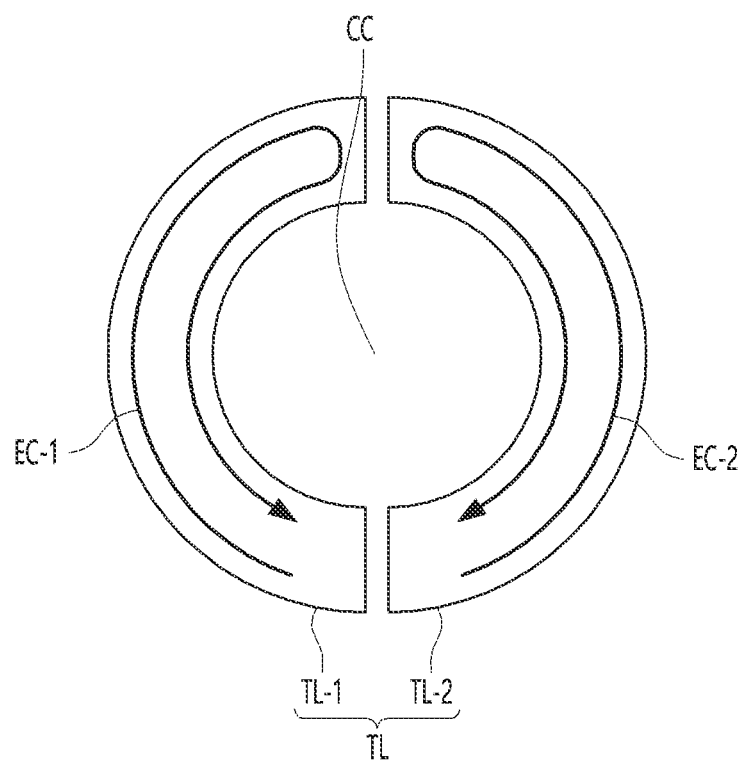

FIGS. 9 and 10 are exemplary views illustrating the shape of the thin film according to the first embodiment of the present disclosure.

According to the first embodiment of the present disclosure, the thin film TL may include a plurality of thin film parts TL-1 and TL-2. The plurality of thin film parts TL-1 and TL-2 may include a first thin film part TL-1 and a second thin film part TL-2.

Each of the first thin film part TL-1 and the second thin film part TL-2 may be disposed outside the central region CC of the working coil. In other words, each of the first thin film part TL-1 and the second thin film part TL-2 may be disposed in an area other than the center area CC of the working coil. The first thin film part TL-1 and the second thin film part TL-2 may be disposed to be symmetrical with respect to the central region CC of the working coil.

For example, each of the first thin film part TL-1 and the second thin film part TL-2 may be formed in a semicircular shape with a concave inside. The first eddy current EC-1 applied to the first thin film part TL-1 forms a closed loop that does not pass through the central region CC of the working coil, and the second eddy current EC-2 applied to the second thin film part TL-2 may forma closed loop that does not pass through the central region CC of the working coil. Accordingly, a closed loop not including the central region CC of the working coil may be formed in the thin film TL. In this case, the coupling force with the magnetic field generated by the working coil WC may be weaker than that of the thin film TL illustrated in FIG. 8.

Accordingly, when the object to be heated HO which is a magnetic material is disposed on the induction heating type the cooktop 1, the magnetic field generated by the working coil WC, passing through the thin film TL illustrated in FIG. 9 or FIG. 10, and reaching the object to be heated HO may be greater than the magnetic field generated by the working coil WC, passing through the thin film TL illustrated in FIG. 8, and reaching the object to be heated HO. Accordingly, when the induction heating type cooktop 1 includes the thin film TL as illustrated in FIG. 9 or FIG. 10, there is an advantage in that the heating performance of the object to be heated HO which is a magnetic material is improved.

Meanwhile, sizes of the concave regions formed in the first thin film part TL-1 and the second thin film part TL-2 may vary. For example, when the size of the concave regions formed in the first thin film part TL-1 and the second thin film part TL-2 illustrated in FIG. 9 is the first size and the sizes of the concave region formed in the first thin film part TL-1 and the second thin film part TL-2 illustrated in FIG. 10 is the second size, the second size may be greater than the first size. As the size of the concave region increases, the coupling force with the magnetic field generated by the thin film TL and the working coil WC may be weakened. The size of the concave region may vary according to the material and thickness of the thin film TL.

Figure 11:
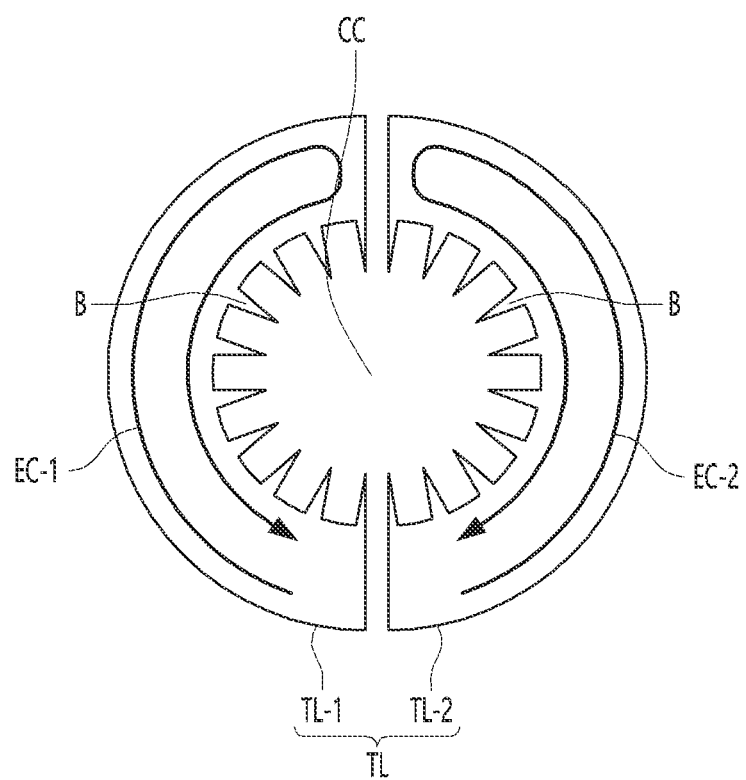
FIG. 11 is an exemplary view illustrating a shape of a thin film according to a second embodiment of the present disclosure.

FIG. 11 is an exemplary view illustrating a shape of a thin film according to a second embodiment of the present disclosure.

According to the second embodiment of the present disclosure, the thin film TL may include a plurality of thin film parts TL-1 and TL-2. The plurality of thin film parts TL-1 and TL-2 may include a first thin film part TL-1 and a second thin film part TL-2.

Each of the first thin film part TL-1 and the second thin film part TL-2 may be disposed outside the central region CC of the working coil. In other words, each of the first thin film part TL-1 and the second thin film part TL-2 may be disposed in an area other than the center area CC of the working coil. The first thin film part TL-1 and the second thin film part TL-2 may be disposed to be symmetrical with respect to the central region CC of the working coil.

For example, each of the first thin film part TL-1 and the second thin film part TL-2 may have a semicircular shape with a concave inside, and at least one protrusion B may be formed in the concave region. The protrusion B may be formed to protrude from the inside of the thin film parts TL-1 and TL-2 toward the center region CC of the working coil. The protrusion B may be formed to have a size in which the eddy currents EC-1 and EC-2 do not flow. In other words, the eddy currents EC-1 and EC-2 may not flow through the projection B. The eddy currents EC-1 and EC-2 do not flow through the protrusions B, so the eddy currents may not be coupled to the magnetic field.

In addition, the protrusion B may diffuse heat generated in the thin films TL-1 and TL-2 to the central region CC of the working coil. Accordingly, there is an advantage in that overheating of the thin films TL-1 and TL-2 can be minimized and heat generated from the thin films TL-1 and TL-2 can be uniformly diffused.

The first eddy current EC-1 applied to the first thin film part TL-1 forms a closed loop that does not pass through the central region CC of the working coil and the second eddy current EC-2 applied to the second thin film part TL-2 may form a closed loop that does not pass through the central region CC of the working coil. Accordingly, a closed loop not including the central region CC of the working coil may be formed in the thin film TL. In this case, the coupling force with the magnetic field generated by the working coil WC may be weaker than that of the thin film TL illustrated in FIG. 8.

Therefore, when the object to be heated HO which is a magnetic material is disposed on the induction heating type cooktop 1, the magnetic field generated by the working coil WC, passing through the thin film TL illustrated in FIG. 11 and reaching the object to be heated HO may be greater than the magnetic field generated by the working coil WC, passing through the thin film TL illustrated in FIG. 8, and reaching the object to be heated HO. Accordingly, when the induction heating type cooktop 1 includes the thin film TL as illustrated in FIG. 11, there is an advantage in that the heating performance of the object to be heated HO, which is a magnetic material, is improved.

Figure 12:
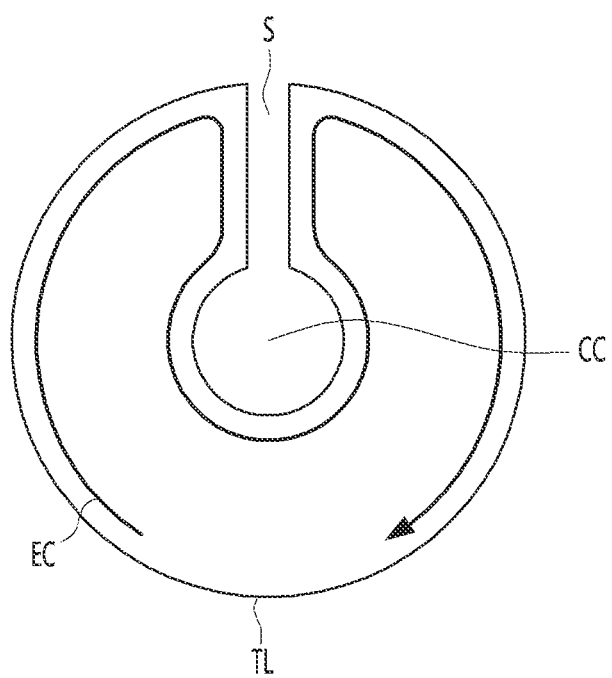
FIG. 12 is an exemplary view illustrating a shape of a thin film according to a third embodiment of the present disclosure.

FIG. 12 is an exemplary view illustrating a shape of a thin film according to a third embodiment of the present disclosure.

According to the third embodiment of the present disclosure, the thin film TL may have a horseshoe shape. The thin film TL may have a shape in which one region S of the donut is opened. Accordingly, the eddy current EC applied to the thin film TL may form a closed loop that does not pass through the central region CC of the working coil. Accordingly, a closed loop not including the central region CC of the working coil may be formed in the thin film TL. In this case, the coupling force with the magnetic field generated by the working coil WC may be weaker than that of the thin film TL illustrated in FIG. 8.

Therefore, when the object to be heated HO, which is a magnetic material, is disposed on the induction heating type cooktop 1, the magnetic field generated by the working coil WC, passing through the thin film TL illustrated in FIG. 12, and reaching the object to be heated HO may be greater than the magnetic field generated by the working coil WC, passing through the thin film TL illustrated in FIG. 8, and reaching the object to be heated HO. Accordingly, when the induction heating type cooktop 1 includes the thin film TL as illustrated in FIG. 12, there is an advantage in that the heating performance of the object to be heated HO, which is a magnetic material, is improved.

Figure 13:
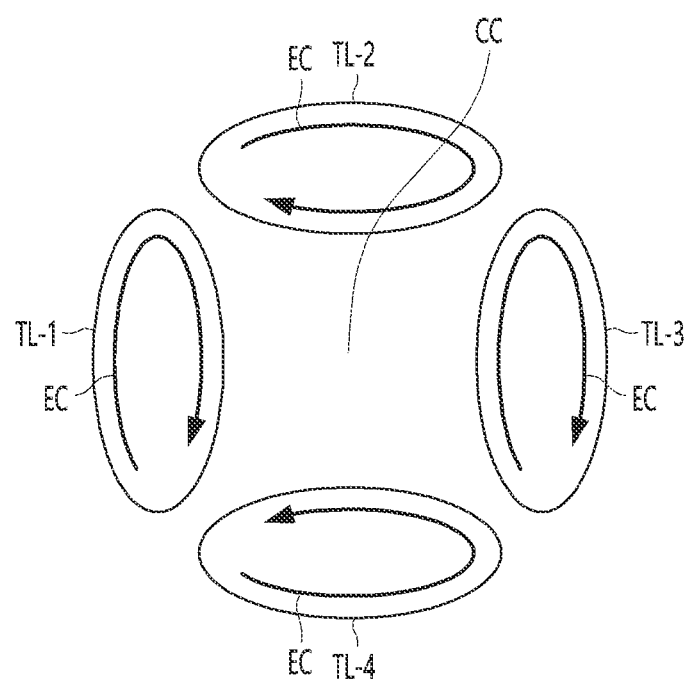
FIG. 13 is an exemplary view illustrating a shape of a thin film according to a fourth embodiment of the present disclosure.

FIG. 13 is an exemplary view illustrating a shape of a thin film according to a fourth embodiment of the present disclosure.

According to the fourth embodiment of the present disclosure, the thin film TL may include a plurality of thin film parts TL-1, TL-2, TL-3, and TL-4. The plurality of thin film parts TL-1, TL-2, TL-3, and TL-4 may include a first thin film part TL-1, a second thin film part TL-2, a third thin film part TL-3, and a fourth thin film part TL-4.

Each of the first to fourth thin film parts TL-1, TL-2, TL-3, and TL-4 may be disposed outside the center region CC of the working coil. In other words, each of the first to fourth thin film parts TL-1, TL-2, TL-3, and TL-4 may be disposed in a region other than the central region CC of the working coil. The first to fourth thin film parts TL-1, TL-2, TL-3, and TL-4 may be disposed to be symmetrical with respect to the center region CC of the working coil.

Each of the first to fourth thin film parts TL-1, TL-2, TL-3, and TL-4 may have a circular shape or an oval shape, but this is only exemplary. In other words, each of the first to fourth thin film parts TL-1, TL-2, TL-3, and TL-4 may be formed in a shape of a triangle, a quadrangle, or the like.

An eddy current EC may be formed in each of the first to fourth thin film parts TL-1, TL-2, TL-3, and TL-4, and each of the eddy currents EC may form a closed loop that does not pass through a center region CC of the working coil. Accordingly, a closed loop not including the central region CC of the working coil may be formed in the thin film TL. In this case, the coupling force with the magnetic field generated by the working coil WC may be weaker than that of the thin film TL illustrated in FIG. 8.

Therefore, when the object to be heated HO, which is a magnetic material is disposed on the induction heating type cooktop 1, the magnetic field generated by the working coil WC, passing through the thin film TL illustrated in FIG. 13, and reaching the object to be heated HO may be greater than the magnetic field generated by the working coil WC, passing through the thin film TL illustrated in FIG. 8, and reaching the object to be heated HO. Accordingly, when the induction heating type cooktop 1 includes the thin film TL as illustrated in FIG. 13, there is an advantage in that the heating performance of the object to be heated HO, which is the magnetic material, improved.

Figure 14:
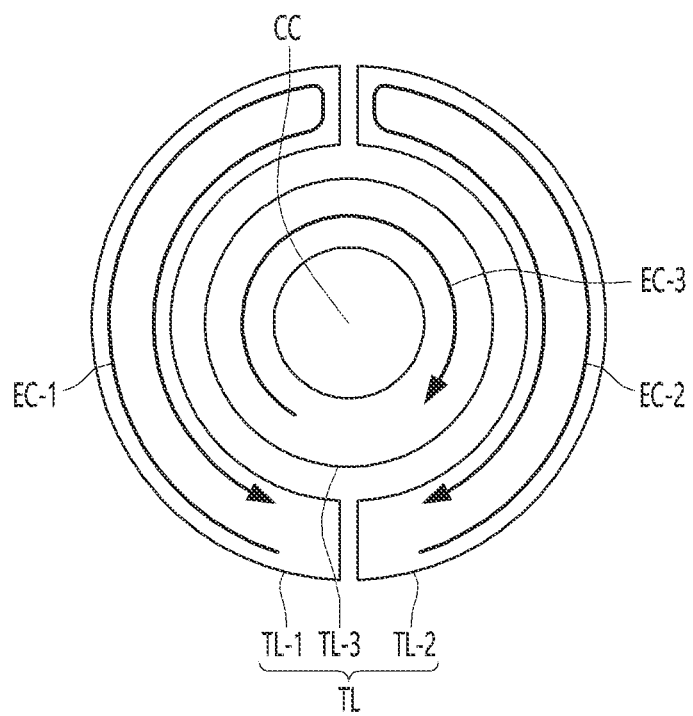
FIG. 14 is an exemplary view illustrating a shape of a thin film according to a fifth embodiment of the present disclosure.

FIG. 14 is an exemplary view stating a shape of a thin film according to a fifth embodiment of the present disclosure.

According to the fifth embodiment of the present disclosure, the thin film TL may include a plurality of thin film parts TL-1, TL-2, and TL-3. The plurality of thin film parts TL-1, TL-2, and TL-3 may include the first thin film part TL-1, the second thin film part TL-2, and the third thin film part TL-3.

Each of the first to third thin film parts TL-1, TL-2, and TL-3 may be disposed outside the central region CC of the working coil. In other words, each of the first to third thin film parts TL-1, TL-2, and TL-3 may be disposed in a region other than the central region CC of the working coil.

For example, each of the first thin film part TL-1 and the second thin film part TL-2 may be formed in a semicircular shape with a concave inside. The first eddy current EC-1 applied to the first thin film part TL-1 forms a closed loop that does not pass through the central region CC of the working coil, and the second eddy current EC-2 applied to the second thin film part TL-2 may form a closed loop that does not pass through the central region CC of the working coil.

In addition, the third thin film part TL-3 may have a donut shape. The third thin film part TL-3 may have an open shape in the center region CC of the working coil.

The third thin film part TL-3 may be disposed inside the first thin film part TL-1 and the second thin film part TL-2 as illustrated in FIG. 14. Alternatively, the third thin film part TL-3 may be disposed outside the first thin film part TL-1 and the second thin film part TL-2.

The third thin film part TL-3 may be one or more. When there are a plurality of third thin film parts TL-3, each of the plurality of third thin film parts TL-3 may be placed inside or outside the first thin film part TL-1 and the second thin film part TL-2.

A closed loop that does not include the center region CC of the working coil may be formed in the thin film TL by the first thin film part TL-1 and the second thin film part TL-2. Accordingly, the coupling force with the magnetic field generated in the working coil WC may be weaker than that of the thin film TL illustrated in FIG. 8.

Therefore, when the object to be heated HO, which is a magnetic material is disposed on the induction heating type cooktop 1, the magnetic field generated from the working coil WC, passing through the thin film TL illustrated in FIG. 14, and reaching the object to be heated HO may be greater than the magnetic field generated by the working coil WC, passing through the thin film TL illustrated in FIG. 8, and reaching the object to be heated HO. Accordingly, when the induction heating type cooktop 1 includes the thin film TL as illustrated in FIG. 14, there is an advantage in that the heating performance of the object to be heated HO, which is the magnetic material, is improved.

Meanwhile, the shapes of the thin film TL illustrated in FIGS. 9 to 14 are merely exemplary and are not limited thereto. In other words, the thin film TL according to an embodiment of the present disclosure may include all shapes formed to have at least one closed loop that does not include the central region CC of the working coil.

Figure 15:
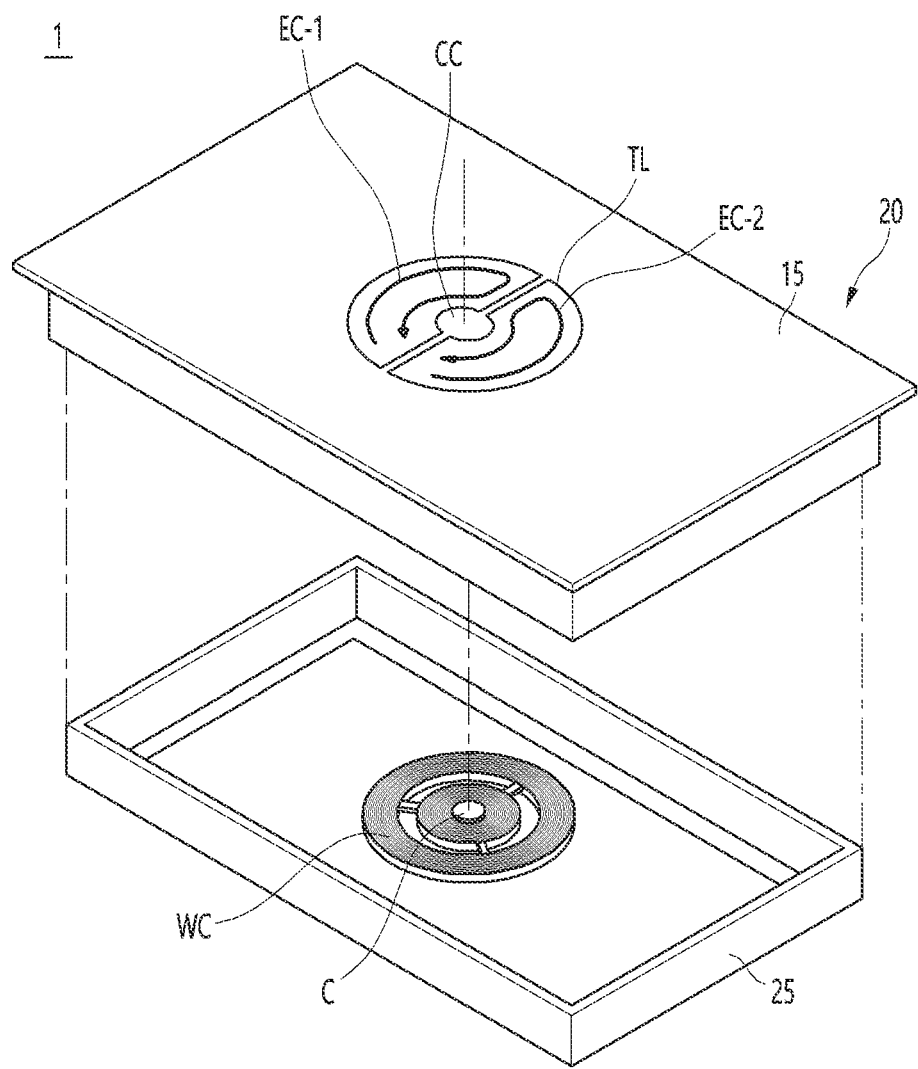
FIG. 15 is a view illustrating a central region of a closed roof and a working coil formed in a thin film according to an embodiment of the present disclosure.

FIG. 15 is a view illustrating a central region of a closed roof and a working coil formed in a thin film according to an embodiment of the present disclosure.

In FIG. 15, the shape of the thin film TL is exemplified as the case illustrated in FIG. 9, but this is not limited thereto because it is merely an example.

Referring to FIG. 15, a closed loop by the first eddy current EC-1 and a closed loop by the second eddy current EC-2 may be formed in the thin film TL. In this case, at least one of the closed loop by the first eddy current EC-1 and the closed loop by the second eddy current EC-2 may not include the central region CC of the working coil.

The center region CC of the working coil may refer to a region overlapping the center C of the working coil WC in a vertical direction.

In other words, the at least one closed loop formed in the thin film TL may be formed so as not to overlap the central region CC of the working coil when viewed from the upper side.

As such, when the closed loop formed in the thin film TL does not include the central region CC of the working coil, since the area of the eddy current applied to the thin film TL is not large, the coupling force with the magnetic field generated in the working coil WC is reduced, and accordingly, a magnetic field coupled with the object to be heated HO, which is a magnetic material, may increase. Accordingly, when the object to be heated HO, which is a magnetic material, is disposed on the induction heating type the cooktop 1, there is an advantage in that heating performance is improved.

However, when the induction heating type cooktop 1 includes a thin film TL formed to have at least one closed loop that does not include the central region CC of the working coil, heating performance of the object to be heated HO which is a magnetic material may be inferior to the heating performance of the object to be heated HO, which is a nonmagnetic material when the induction heating type cooktop 1 includes the thin film TL formed to have only a closed loop including the central region CC of the working coil.

Tables 1 to 3 below show the frequency, equivalent resistance, increased inductance, peak current, output power, the ratio of the power consumed by the thin film of the output power, and the ratio of the power consumed by the object to be heated of the output power for each when the object to be heated is a nonmagnetic material (for example, a glass load) or a magnetic material (for example, a clad load). In particular, Table 1 shows when the thin film TL has a shape as illustrated in FIG. 9 of a silver material, Table 2 shows when the thin film TL has a shape as illustrated in FIG. 10 of a silver material, and Table 3 shows when the thin film TL has a shape as illustrated in FIG. 11 of a silver material.

TABLE 1

| | Pattern 1 | | | | | | |
|---|---|---|---|---|---|---|---|
| Load Type | Frequency [kHz] | Req[Ω] | Leq[µH] | Ipeak[A] | P[kW] | P_Silver thin film[%] | P_Load [%] |
| Silver thin film + Glass load | 36 | 0.442 | 33.5 | 101 | 1.1 | | |
| Silver thin film + Clad load | 41 | 1.47 | 25.6 | 90.6 | 3.0 | 1.9 | 85.4 |

TABLE 2

| | Pattern 2 | | | | | | |
|---|---|---|---|---|---|---|---|
| Load Type | Frequency [kHz] | Req[Ω] | Leq[µH] | Ipeak[A] | P[kW] | P_Silver thin film[%] | P_Load [%] |
| Silver thin film + Glass load | 36 | 0.153 | 33.89 | 98.9 | 0.37 | | |
| Silver thin film + Clad load | 40 | 1.426 | 26 | 98 | 3.4 | 3.7 | 92.3 |

TABLE 3

| | Pattern 3 | | | | | |
|---|---|---|---|---|---|---|
| Load Type | Frequency [kHz] | Req[Ω] | Leq[μH] | Ipeak[A] | P[kW] | P_Silver thin film[%] | P_Load [%] |
| Silver thin film + Glass load | 36 | 0.167 | 33.9 | 98 | 0.4 | | |
| Silver thin film + Clad load | 40 | 1.49 | 26.4 | 92 | 3.2 | 4.4 | 91.6 |

As such, the ratio of the power consumed by the thin film of the output power and the ratio of the power consumed by the object to be heated of the output power may vary according to the shape of the thin film TL. Accordingly, the cooktop 1 according to the embodiment of the present disclosure may include any one of various thin films TL formed to have at least one closed loop that does not include the central region CC of the working coil based on the target output for each of the nonmagnetic material and the magnetic material. Accordingly, the present disclosure may provide an induction heating type cooktop 1 capable of minimizing a decrease in heating efficiency for a magnetic material and heating the nonmagnetic material to a target power.

Meanwhile, according to another embodiment of the present disclosure, the working coil WC may be redesigned to minimize decrease in the heating performance of the object to be heated HO which is a nonmagnetic material. Specifically, according to another embodiment of the present disclosure, the induction heating type cooktop 1 includes a thin film TL formed to have at least one closed loop that does not include the central region CC of the working coil, and, at this time, the working coil WC may be formed in a plurality of layers or may be formed in a number of turns equal to or greater than a preset number.

TABLE 4

| | Pattern 3 (17 turns, 2 layers) | | | | | |
|---|---|---|---|---|---|---|
| Load type | Frequency [kHz] | Req[Ω] | Leq[μH] | Ipeak[A] | P[kW] | P_Silver thin film[%] | P_Load [%] |
| Silver thin film + Glass load | 36 | 0.53 | 130.6 | 82.7 | 0.9 | | |

Table 4 above shows that the induction heating type cooktop 1 includes a thin film TL of a silver material having a shape as illustrated in FIG. 11 and shows a frequency, equivalent resistance, increased inductance, peak current, and output power when the working coil WC is formed with the number of turns (for example, 17 turns) greater than or equal to the preset number of the two-layer structure. When compared with Table 3, it can be seen that the output power increases and decreases.

As such, according to another embodiment of the present disclosure, the induction heating type cooktop 1 includes a thin film TL formed to have at least one closed loop that does not include the central region CC of the working coil, but includes a plurality of layers or by forming a number of turns equal to or greater than a preset number, and thus there is an advantage of increasing the heating performance of the object to be heated HO which is a magnetic material, and minimizing decrease in the heating performance of the object to be heated HO which is a nonmagnetic material.

The above description is merely illustrative of the technical spirit of the present disclosure, and various modifications and variations will be possible without departing from the essential characteristics of the present disclosure by those of ordinary skill in the art to which the present disclosure pertains.

Accordingly, the embodiments disclosed in the present disclosure are for explanation rather than limiting the technical spirit of the present disclosure, and the scope of the technical spirit of the present disclosure is not limited by these embodiments.

The protection scope of the present disclosure should be interpreted by the following claims, and all technical ideas within the scope equivalent thereto should be construed as being included in the scope of the present disclosure.

The invention claimed is:

1. An induction heating type cooktop comprising:
   a case;
   a cover plate coupled to an upper end of the case and defining an upper plate portion for placing an object to be heated thereon;
   a single layer of working coil positioned in the case;
   a thin film coated on the upper plate portion and configured to be inductively heated by the working coil; and
   an adiabatic material provided between the upper plate portion and the working coil,
   wherein the working coil is configured to, based on the object being a nonmagnetic object, induce an electrical current at the thin film to thereby heat the nonmagnetic object,
   wherein the working coil is configured to, based on the object being a magnetic object, generate and provide a magnetic flux toward the magnetic object to thereby heat the magnetic object,
   wherein the working coil overlaps the thin film in a vertical direction and includes a central region,
   wherein the thin film comprises a conductive region that is made of a conductive material and surrounds a portion of a central region of the thin film, the thin film defining at least one open region that radially extends through the conductive material to the central region of the thin film, the central region of the thin film being configured to guide at least a portion of the magnetic flux generated from the working coil toward the object, and wherein the conductive region is configured to define at least one closed loop of electrical current therein.

2. The induction heating type cooktop of claim 1, wherein the at least one closed loop of electrical current provided at the thin film does not vertically overlap the central region of the working coil.

3. The induction heating type cooktop of claim 1, wherein a skin depth of the thin film is thicker than a thickness of the thin film.

4. The induction heating type cooktop of claim 1, wherein the thin film includes at least one thin film part that does not overlap the central region of the working coil.

5. The induction heating type cooktop of claim 4, wherein the at least one thin film part includes a first thin film part and a second thin film part that do not overlap the central region of the working coil.

6. The induction heating type cooktop of claim 5, wherein each of the first thin film part and the second thin film part includes at least one protrusion that does not allow an eddy current to flow.

7. The induction heating type cooktop of claim 6, wherein the at least one protrusion is positioned at a side of each of the first thin film part and the second thin film part that faces the central region of the working coil, the at least one protrusion extending toward the central region of the working coil.

8. The induction heating type cooktop of claim 4, wherein the thin film includes:
    a first thin film part configured to provide a first closed loop of electrical current that does not enclose the central region of the working coil; and
    a second thin film part configured to provide a second closed loop of electrical current that encloses the central region of the working coil.

9. The induction heating type cooktop of claim 8, wherein the second thin film part is at least partially surround surrounded by the first thin film part or at least partially surrounds the first thin film part.

10. An induction heating type cooktop comprising:
    a plate for placing an object to be heated thereon;
    a single layer of working coil positioned under the plate; and
    a thin film coated on the plate and configured to be inductively heated based on operation of the working coil, wherein the working coil is configured to, based on the object being a nonmagnetic object, induce an electrical current in the thin film to thereby heat the nonmagnetic object, wherein the working coil is configured to, based on the object being a magnetic object, generate and provide a magnetic flux toward the magnetic object to thereby heat the magnetic object, wherein the working coil overlaps the thin film in a vertical direction and includes a central region, wherein the thin film comprises a conductive region that is made of a conductive material and surrounds a portion of a central region of the thin film, the thin film defining at least one open region that radially extends through the conductive material to the central region of the thin film, the central region of the thin film being configured to guide magnetic flux generated from the working coil toward the object, and wherein the conductive region is configured to define at least one closed loop of electrical current therein.

11. The induction heating type cooktop of claim 10, wherein the at least one closed loop of electrical current provided at the thin film does not vertically overlap the central region of the working coil.

12. The induction heating type cooktop of claim 10, wherein a skin depth of the thin film is thicker than a thickness of the thin film.

13. The induction heating type cooktop of claim 10, wherein the thin film includes at least one thin film part that does not overlap the central region of the working coil.

14. The induction heating type cooktop of claim 13, wherein the at least one thin film part includes a first thin film part and a second thin film part that do not overlap the central region of the working coil.

15. The induction heating type cooktop of claim 14, wherein each of the first thin film part and the second thin film part includes at least one protrusion that does not allow an eddy current to flow.

16. The induction heating type cooktop of claim 15, wherein the at least one protrusion is positioned at a side of each of the first thin film part and the second thin film part that faces the central region of the working coil, the at least one protrusion extending toward the central region of the working coil.

17. The induction heating type cooktop of claim 13, wherein the thin film includes:
    a first thin film part configured to provide a first closed loop of electrical current that does not enclose the central region of the working coil; and
    a second thin film part configured to provide a second closed loop of electrical current that encloses the central region of the working coil.

18. The induction heating type cooktop of claim 17, wherein the second thin film part is at least partially surround surrounded by the first thin film part or at least partially surrounds the first thin film part.

\* \* \* \* \*